United States Patent
Brown

(10) Patent No.: US 9,010,065 B2
(45) Date of Patent: Apr. 21, 2015

(54) METHOD, APPARATUS, AND KIT FOR INSTALLATION OF CONSTRUCTION ITEMS WITHIN A ROUGH OPENING

(71) Applicant: Shimfast, LLC, Jefferson, ME (US)

(72) Inventor: Bruce Merrill Brown, Jefferson, ME (US)

( * ) Notice: Subject to any disclaimer, the term of this patent is extended or adjusted under 35 U.S.C. 154(b) by 0 days.

(21) Appl. No.: 13/961,004

(22) Filed: Aug. 7, 2013

(65) Prior Publication Data
US 2014/0190119 A1    Jul. 10, 2014

Related U.S. Application Data

(60) Provisional application No. 61/848,549, filed on Jan. 7, 2013.

(51) Int. Cl.
*E06B 1/04* (2006.01)
*F16B 33/00* (2006.01)
*E06B 1/60* (2006.01)

(52) U.S. Cl.
CPC ............... *F16B 33/00* (2013.01); *E06B 1/6076* (2013.01)

(58) Field of Classification Search
CPC ........... E06B 1/6076; E06B 1/02; E06B 1/60; E06B 1/603
USPC ............................................. 52/217, 204.52
See application file for complete search history.

(56) References Cited

U.S. PATENT DOCUMENTS

| | | | |
|---|---|---|---|
| 3,715,850 A * | 2/1973 | Chambers | 52/701 |
| 4,486,134 A * | 12/1984 | White | 411/103 |
| 5,205,692 A | 4/1993 | Kelbert et al. | |
| 5,333,423 A * | 8/1994 | Propst | 52/126.6 |
| 5,415,510 A * | 5/1995 | Funaki et al. | 411/384 |
| 5,655,342 A | 8/1997 | Guillemet et al. | |
| 6,167,663 B1 * | 1/2001 | Nakamoto et al. | 52/217 |
| 6,213,698 B1 * | 4/2001 | Cosenza | 411/34 |
| 6,216,402 B1 | 4/2001 | Van de Laar | |
| 6,584,745 B1 | 7/2003 | Johansson | |
| 6,789,993 B2 | 9/2004 | Ozawa et al. | |
| 6,826,878 B1 | 12/2004 | Rovtar | |

(Continued)

OTHER PUBLICATIONS

The Home Depot U.S.A. Inc./HomeDepot.com, "Hex-Head Slotted Sheet Metal Screws", http://www.homedepot.com/h_d1N-5yc1v/R-202705945/h_d2/ProductDisplay?catalogId=10053&landId=-1&keyword=Hex-Head+Slotted+Sheet+Metal+Screws&storeId=10051#.UNCOXayZPi4, Atlanta, GA, printed on Oct. 22, 2013, 2 pages.

(Continued)

*Primary Examiner* — Elizabeth A Plummer
(74) *Attorney, Agent, or Firm* — Tredecim LLC; Sean L. Sweeney

(57) ABSTRACT

A method, apparatus, and kit for adjustment of a construction unit with a rough opening. The construction unit may be a window, door, or similar construction element that requires shimming and squaring up within a rough opening. An adjustment mechanism is included that has a head section and threaded section. The head section engages the construction unit by abutment and the threaded section engages the rough opening by threaded retention. After initial embedding of the adjustment mechanism within the inner surface of the rough opening, the adjustment mechanism is rotationally engaged via a wrench for fine-tuned shimming of the construction unit.

7 Claims, 4 Drawing Sheets

(56) References Cited

U.S. PATENT DOCUMENTS

| | | | | |
|---|---|---|---|---|
| 7,025,552 | B2* | 4/2006 | Grubert et al. | 411/546 |
| 7,987,637 | B2 | 8/2011 | Smith | |
| 8,443,559 | B2* | 5/2013 | Nugue | 52/204.593 |
| 2005/0008449 | A1* | 1/2005 | Horita | 411/383 |

OTHER PUBLICATIONS

FMW Fasteners/FMWFasteners.com, "Hex Washer Head Strong-Drive Wood Screws", http://www.fmwfasterners.com/Products?Hex-Head-Wood-Screws-Timber-Screws-Hex-Washer-Head-Wood-Screws/Hex-Washer-Head-Strong-Drive-Wood-Screws-Type-17, , Houston, TX, printed on Oct. 22, 2013, 1 page.

McFeely's/McFeelys.com, "Hex Washer Head Hex Drive Wood Screws", http://www.mcfeelys.com/product/HTL-1450/14-x-5-Trusslokreg-Engineered-Wood-Screws-NoCoRode-Plus-Hex-Washer-Head-Hex-Drive, Madison, WI, printed Oct. 22, 2013, 1 page.

The Home Depot U.S.A. Inc./HomeDepot.com, "Ledgerlok Screws", http://www.homedepot.com/h_d1/N-5yc1v/R-202502180/h_d2/ProductDisplay?catalogId=10053&langId=-1&keyword+Ledgerlok&storeId=10051#.UNCZUqyZPi4, Atlanta, GA, printed on Oct. 22, 2013, 2 pages.

Bolt Depot/BoltDepot.com "Fastener Type Chart", http://www.boltdepot.com/fastener-information/Type-Chart.aspx, North Weymouth, MA, printed on Oct. 22, 2013, 4 pages.

Lee Valley Tool Ltd./LeeValley.com, "Top Star Shim Screws", http://www.leevalley.com/US/hardware/page.aspx?p=69602&cat=3,41306.69644&ap=1, Ogdensburg, NY, Copyright 1998 to 2013 , printed on Oct. 22, 2013, 1 page.

Hanley Wood, LLC/JLCOnline.com, "Faster Jamb Extensions", http://www.jlconline.com/carpentry/faster-jamb-extensions.aspx, Washington DC, printed on Oct. 22, 2013, 4 pages.

Hanley Wood, LLC/JLCOnline.com, "Long Drywall Screws for Shims", http://forums.jlconline.com/forums/showthread.php?24086-Using-drywall-screws-for-shims, Washington DC, printed on Oct. 22, 2013, 3 pages.

ProudlyBuilt.com, "Shimming with Screws", by Luke on Jun. 12, 2011, http://www.proudlybuilt.com/uncategorized/screw-that/, printed on Oct. 22, 2013, 2 pages.

Lowe's ProServices, "Shimming Window Jambs with Drywall Screws", http://www/lowesforpros.com/shimming-window-jambs-with-drywall-screws, printed on Dec. 11, 2012, 1 page.

Truth Hardware, "Jamb Jacks", https://www.truth.com/main/catalog/FullCatalog_03-19-2012.pdf, dated Mar. 19, 2012, Owatonna, MN, 4 pages.

Conservation Technology, "Shim Screws", http://www.conservationtechnology.com/building_shimscrews.html, copyright 2008, printed on Jun. 22, 2013, 4 pages.

GRK Fasteners, "Top Star (TM) Shim Screw" http://www.grkfasteners.com/index.php/en/products/top-star, Ontario, Canada, printed on Jun. 22, 2013, 2 pages.

* cited by examiner

METHOD, APPARATUS, AND KIT FOR INSTALLATION OF CONSTRUCTION ITEMS WITHIN A ROUGH OPENING

CROSS REFERENCE TO RELATED APPLICATIONS

This application claims the benefit of priority of U.S. Provisional Patent Application No. 61/848,549 filed 7 Jan. 2013, which is incorporated herein by reference.

FIELD OF THE INVENTION

The present invention relates generally to the field of construction. More particularly, the present invention relates to installation of construction items, such as windows and doors, into a rough opening.

BACKGROUND OF THE INVENTION

In the construction trade, it has long been known that items such as window and door jambs require adjustment in order to fit properly within a rough opening framed for such item. Window jambs are typically known to be installed after a window unit is in place, whereas door jambs are typically known to be provided integrated with the door unit. In either instance, the jambs require squaring up within the rough opening. Typically, beveled shims fabricated from split wood such as cedar are placed around the given item (i.e., window or door jamb) during installation and lodged in place between the item's outer edges and the rough opening. This method of "shimming" in order to square up the installed jamb is therefore well known by builders. However, this known method of shimming is inexact, awkward, and time-consuming. Moreover, it can be very difficult to shim up a jamb with precision in this manner.

Another known technique used by builders is the installation of one or more screws into the rough opening prior to placement of the jamb therein. Such screw(s) are engaged with the rough opening only as far as deemed necessary to provide spacing for the jamb. If adjustments are needed to provide more space or less space for the jamb placement, then the jamb (in the instance of a window) or frame/jamb (in the instance of a door) can be taken out of the rough opening and set aside while the screw(s) are readjusted into or out of the side(s) of the rough opening. Once the screw(s) are readjusted, the jamb or frame/jamb can be placed back into the rough opening. This trial and error cycle of adjustment can be repeated until proper spacing and squaring up is attained. It should therefore be realized that this construction method may be rather tedious and time-consuming. Moreover, the screw(s) are often knocked or tapped out of place by the jamb if precise care is not taken in placement of the window or door jamb, thereby necessitating further time-consuming iterations of adjustments.

It is, therefore, desirable to provide an apparatus and related method for quickly and easily shimming up window or door jambs during its installation into a rough opening.

SUMMARY OF THE INVENTION

It is an object of the present invention to obviate or mitigate at least one disadvantage of previous shimming apparatus and methods.

In a first aspect, the present invention provides a method of installing a construction unit within a pre-framed rough opening, the method including: embedding a plurality of adjustment mechanisms within an inner edge of a rough opening; inserting a construction unit within the rough opening for abutment with the plurality of adjustment mechanisms; and engaging each one of the plurality of adjustment mechanisms with a wrench in a rotating manner so as to adjust the abutment of the construction unit with the one or more adjustment mechanisms; wherein iteratively engaging of each one of the plurality of adjustment mechanisms serves to shim the construction unit within the rough opening until the construction unit is squarely secured within the rough opening.

In a further embodiment, there is provided an apparatus for installation of a construction unit within a pre-framed rough opening, the apparatus including: a head section including a screw interface for operative engagement with a screwdriver, a first disk-like surface for abutting engagement with the construction unit, a nut-like structure for operative engagement with a wrench; a threaded section affixed to the head section, the threaded section including a threaded surface for retained engagement with a rough opening, a screw head forming the screw interface flush with the first disk-like surface; and wherein adjustment of the apparatus via the wrench in operative engagement with the nut-like structure provides support to the construction unit within the rough opening via the first disk-like structure.

In further aspect, the present invention provides a kit for installation of a construction unit within a pre-framed rough opening, the kit including: a plurality of adjustment mechanisms each capable of shimming an outer edge of a construction unit against an inner surface of a rough opening, each one of the adjustment mechanisms having a head section including a screw interface for operative engagement with a screwdriver, a first disk-like surface for abutting engagement with the construction unit, a nut-like structure; a threaded section affixed to the head section, the threaded section including a threaded surface for retained engagement with a rough opening, a screw head forming the screw interface flush with the first disk-like surface; and a wrench capable of rotation of each the adjustment mechanism by way of operative engagement with the nut-like structure such that the first disk-like surface provides support to the construction unit within the rough opening.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and apparatus that fulfills rapid installation of a construction unit which may be varied construction items, such as jambs of windows and doors, into a rough opening. Moreover, the present invention advantageously enables accurate adjustment of the given construction item being installed including shimming and squaring-up of the construction items relative to the rough opening into which it is being installed. This improves repeatability of quick installations with reduced errors such that quality of construction can be maintained and improved without time-consuming and costly labor. Still further, the present invention also serves to reduce the necessary construction skills required during, for example, window jamb or door jamb installation into a rough opening thereby enabling do-it-yourself homeowners to undertake work typically otherwise done by skilled carpenters.

Figure 1A:
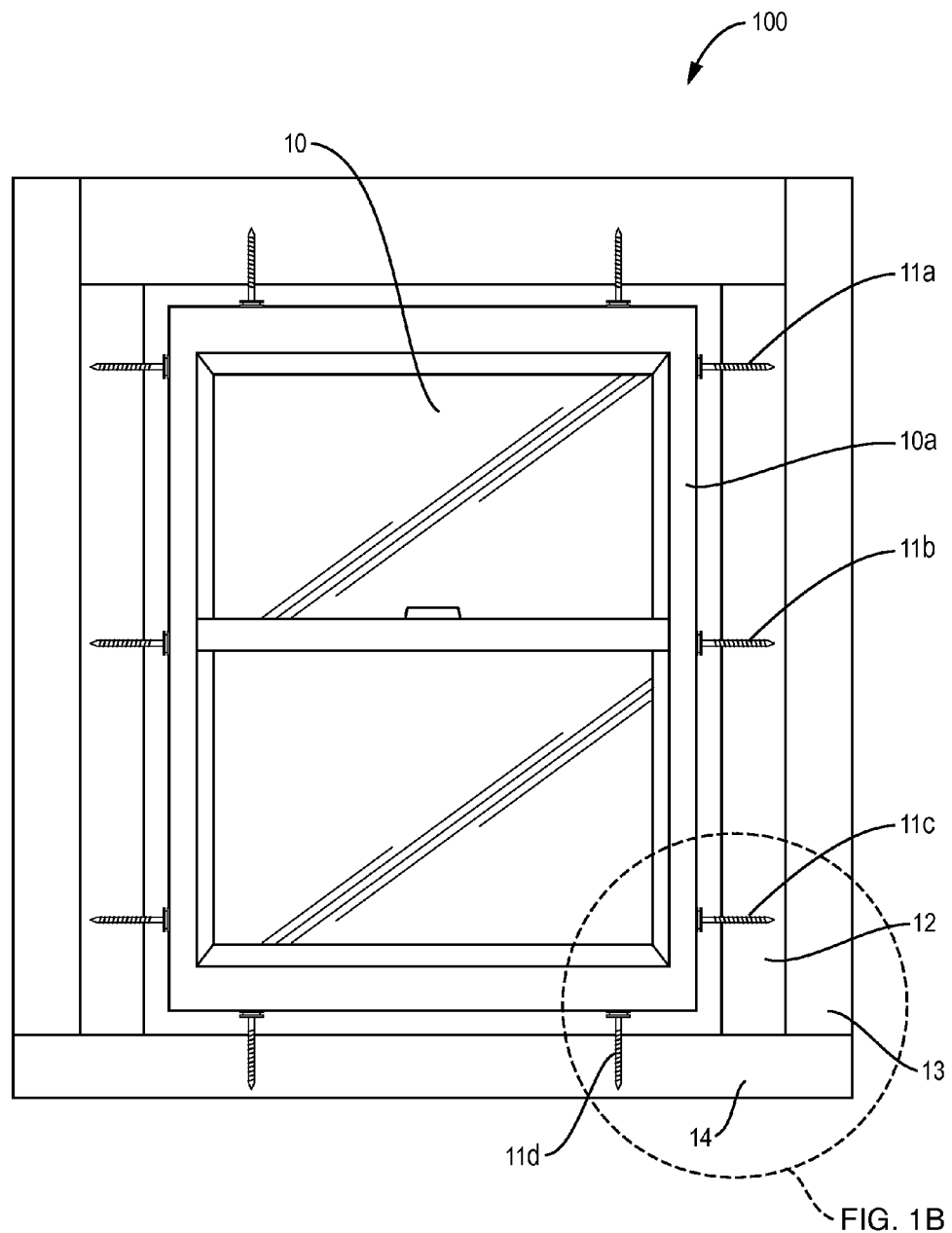
FIG. 1A is an elevation view of a window in place with adjustment mechanisms in accordance with the present invention with one corner of such window circled in enlargement.
Figure 1B:
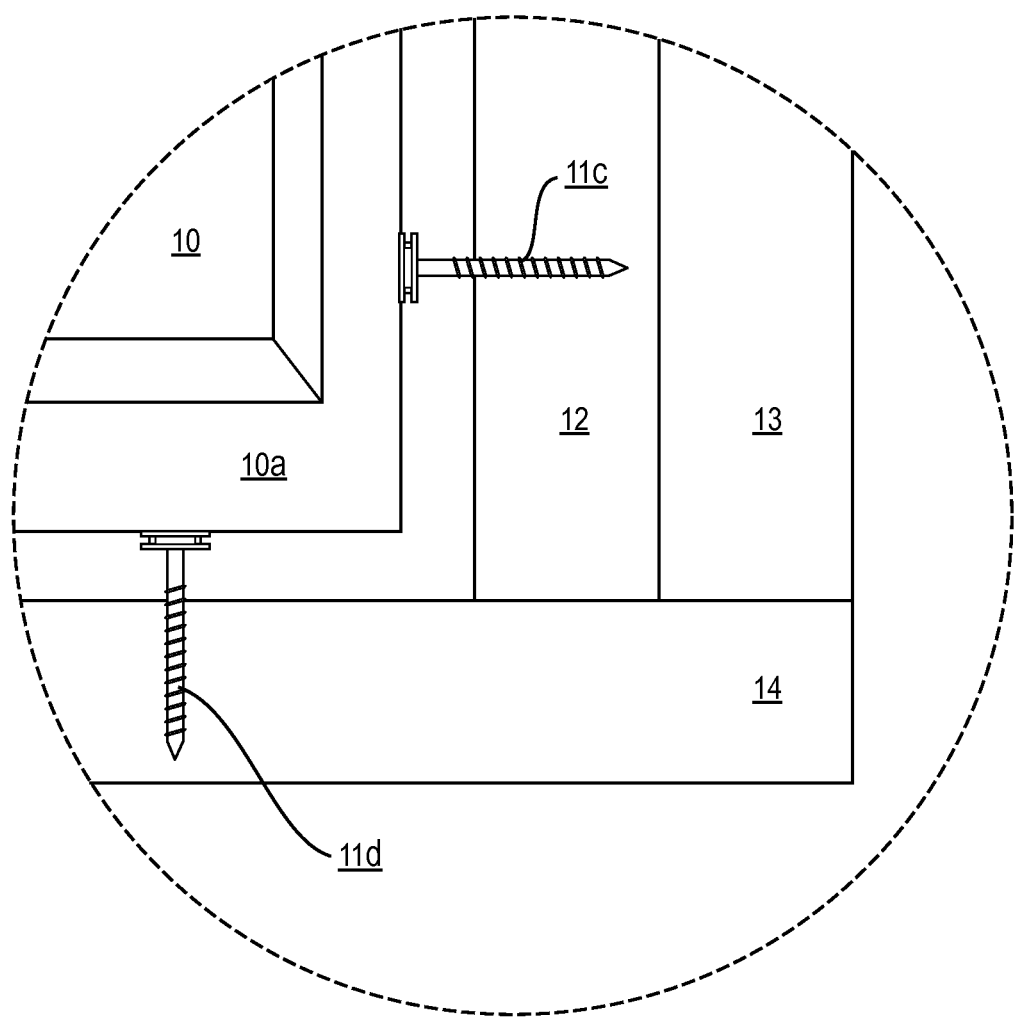
FIG. 1B is the enlargement shown circled in FIG. 1A.

With reference to FIG. 1A, there is illustrated an elevation view 100 of a window unit 10 in place with adjustment mechanisms (several being labeled as elements 11a through 11d) in accordance with the present invention with one corner of such window 10 circled in enlargement. FIG. 1B is the enlargement shown circled in FIG. 1A. It is clear, therefore, from FIGS. 1A and 1B that the window unit 10 is shown within the rough opening of a section of a framed wall shown in the enlargement by studs 12, 13, and 14. Such roughed-in framing construction is well known in the carpentry art and will not be further described herein. The window unit 10 typically includes a trim board which forms the jamb 10a whereby a gap exists between the inner surfaces of the rough opening and the trim board of the window unit. It is within this gap that the inventive adjustment mechanism resides. In this particular arrangement as shown, there are ten adjustment mechanisms (several being labeled as elements 11a through 11d) placed at even intervals around the periphery of the jamb 10a. It should be understood that while ten such adjustment mechanisms are shown, there may be more or fewer used depending upon the dimensions of the given window unit. For example, a large window unit may require many more such adjustment mechanisms. Likewise, a very wide but short window unit may requirement many adjustment mechanisms on the longer top and bottom gaps, but much fewer on the shorter side gaps. Thus, the given window unit will dictate the precise placement and number of adjustment mechanisms.

It should further be understood that although a window unit is shown and described in conjunction with the present invention, the inventive adjustment mechanisms may indeed be used in any other implementation including, but not limited to, installation of door units within rough openings. Moreover, the common feature of a framed unit (e.g., window, door, or other similar structures requiring squaring up) being installed within a rough opening is a requirement for applicability of the present invention.

Figure 2:
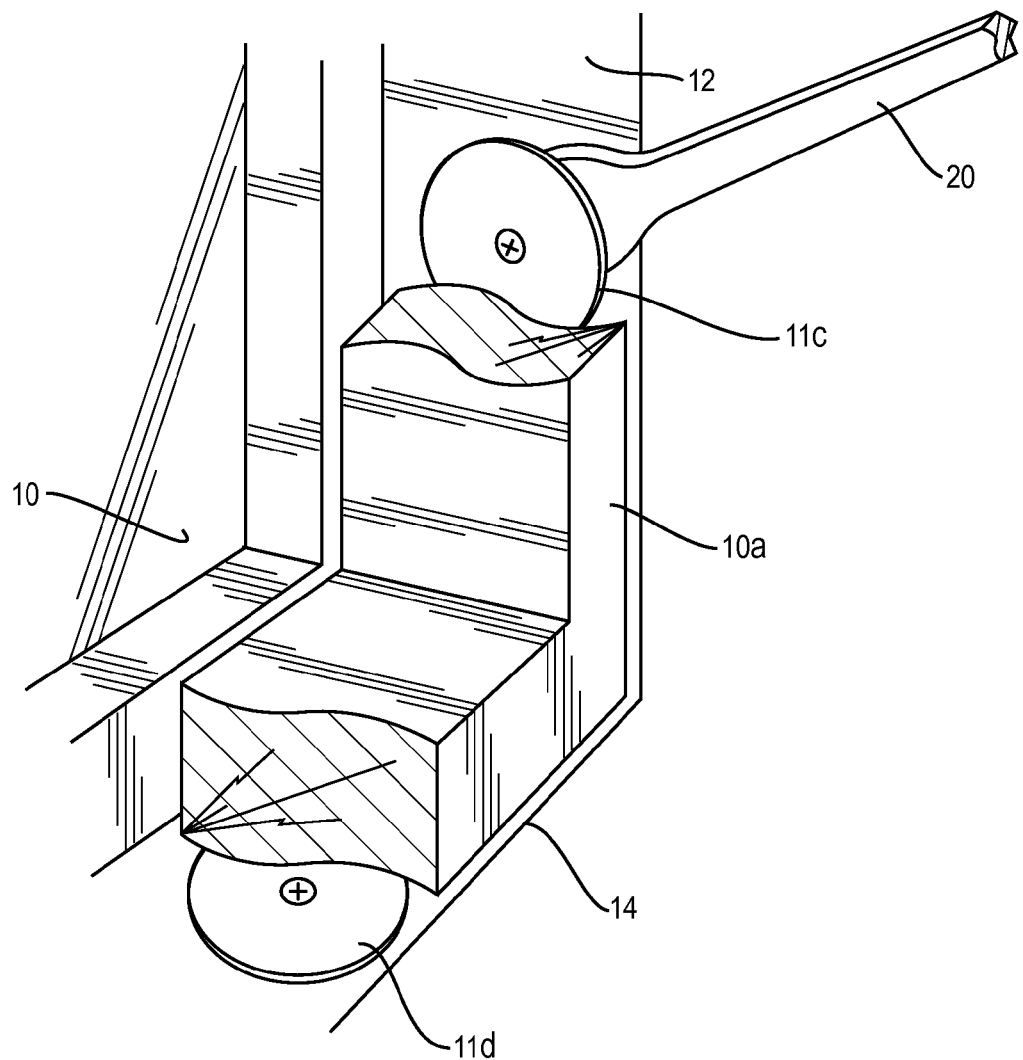
FIG. 2 is a partially cut-away three-dimensional illustration of the embodiment illustrated in FIG. 1B with adjustment mechanisms in accordance with the present invention and further being tightened via a wrench.

With regard to FIG. 2, there is illustrated a partially cutaway three-dimensional illustration which corresponds to the structure of FIG. 1B and whereby an adjustment mechanism in accordance with the present invention being tightened via a wrench 20. In particular, this illustrates a first embodiment 30 of the inventive adjustment mechanism which is further illustrated in the three dimensional view of FIG. 3. In this first embodiment 30, the adjustment mechanism includes a threaded section 32 with self-tapping tip 31, and a head section 35. The threaded section 32 is configured to engage the inner surface of the rough opening. Commonly, the rough opening will be provided in terms of wooden studs. In such instance, the threaded section 32 would be configured to include larger threads suitable for engagement with wood. However, if the rough opening was formed via some other material such as steel framing or concrete material (e.g., cinder blocks), then it should be readily apparent that the threaded section 32 would include, respectively, finer metal threads or hardened masonry threads and for example a self-tapping tip 31 with a hardened carbide tip (not shown). Overall, it should be readily apparent that different sized threads may be required for different rough opening materials.

Figure 3:
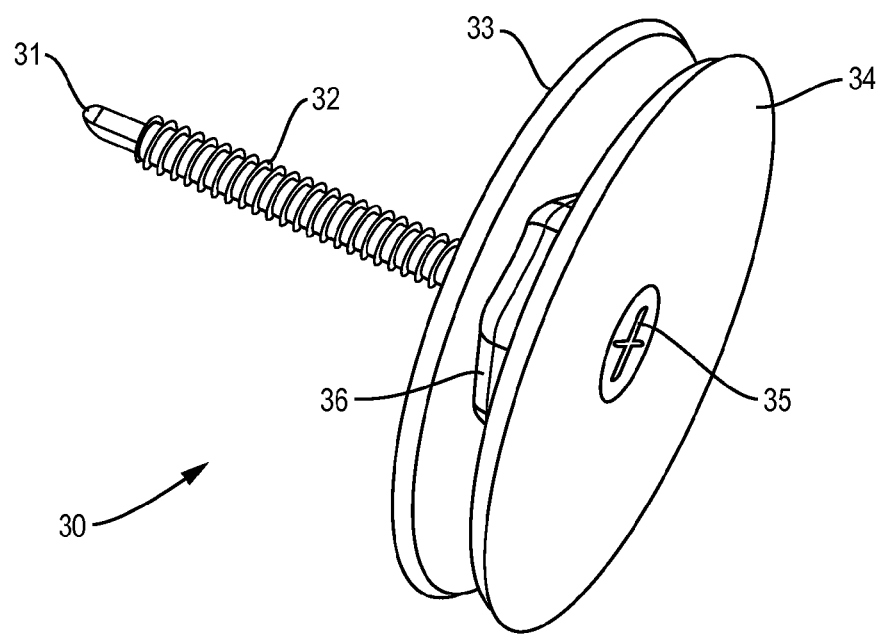
FIG. 3 is a three-dimensional view of the first embodiment of an adjustment mechanism in accordance with the present invention.

With further reference to FIG. 3, the head section 35 is seen to include two disk-like surfaces 33 and 34 with an intermediate portion 36 situated there between. While the two disk-like surfaces 33 and 34 include a circumferential periphery, the intermediate portion 36 includes a sectioned outer periphery having six (6) flat edges which preferably forms a hexagonal nut structure. The intermediate portion 36 is therefore able to be engaged with a standard wrench so long as the hexagonal nut structure formed is dimensioned for the given wrench used. The two disk-like surfaces 33 and 34 basically form a slot there between such that the wrench is slotted therein. In other words, the present invention may include an intermediate portion 36 which corresponds to a standardized wrench size using, for example, ISO Metric, American/English, British Standard, or any other standardized sizes. Thus, it should be understood that the particular dimensions of the intermediate portion 36 may vary without straying from the intended scope of the present invention. Likewise, though a hexagonal nut formation is described herein as preferred, it should be readily apparent that variations in the shape of the nut formed (e.g., square nut) may occur without straying from the intended scope of the present invention.

The gap between the two disk-like surfaces 33 and 34 in which the intermediate portion resides should be sufficiently dimensioned so as to allow a standard wrench to fit therein. However, while such standardization is desirable, it should also be understood that a proprietary width may be useful such that a non-standard, thin gap between the two disk-like surfaces 33 and 34 would therefore require a correspondingly non-standard, thin wrench. It should be understood that the benefit to a proprietary thin gap with related proprietary thin wrench would be an advantageous ability of the present invention to be used within tight workspaces where very little room is available in the gap between the window jamb's outer edge and the rough opening's inner surface. In such instance, the present invention may be provided in the form of a kit where such kit would be made available with a minimum set of adjustment mechanisms combined with a correspondingly sized, non-standard wrench. It should therefore be readily apparent that such wrench provided within the kit may be non-standard in both its thickness and also with regard to the sizing and engagement with the nut-like intermediate portion. Thus, the intermediate portion 36 may also be a non-standard nut size and/or dimension (e.g., a 7-sided nut having a maximum radius of 3.875 mm or any other proprietary configuration).

Figure 4:
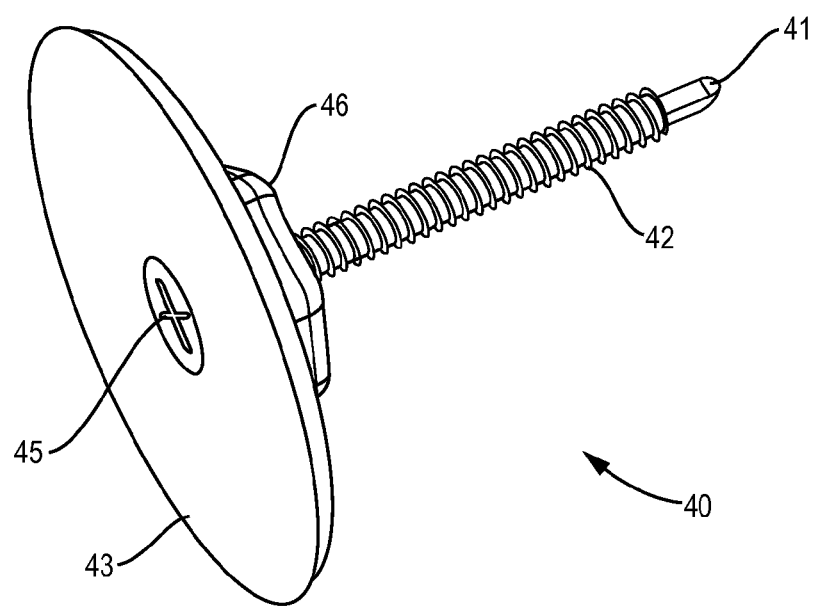
FIG. 4 is a three-dimensional view of the second embodiment of an adjustment mechanism in accordance with the present invention.

With further reference to FIG. 4, there is illustrated a three-dimensional view of the second embodiment 40 of an adjustment mechanism in accordance with the present invention. This second embodiment 40 is similar to the first embodiment 30 except that only one disk-like surface 43 is provided in the head section 45 of the adjustment mechanism. Here, the single disk-like surface 43 exists on the head position at the extreme opposite from the tip 41 of the threaded section 42 which itself screws into the inner edge of the rough opening. A nut-like portion 46, which mirrors the intermediate portion 36 in form and function, is disposed below the disk-like surface 43. Engagement with a wrench (either standard sizing or non-standard sizing) is accomplished in a manner similar to that described hereinabove with regard to the first embodiment 30. However, it should be understood that because only one disk-like surface 43 exists, there is no slot to retain a wrench. Rather, a user would require somewhat more dexterity in manipulating the wrench during use of the second embodiment 40 versus the first embodiment 30. Notwithstanding this minor difference, one benefit of a single disk-like surface 43 resides in reduced materials required during manufacture of the second embodiment 40.

In either embodiment 30 or 40 with either the single or double disk-like surface(s), the same principles of installation apply. Both embodiments involve a threaded section which first engages the inner edge of the rough opening. Preferably, the threaded section is self-tapping such that a minimal amount of pressure exerted by the user may initially embed the adjustment mechanism. The threaded section may be a metal screw (for example only—a zinc 8×1¼" phillips hex washer full thread self-drilling screw—though other sizes are possible) whereby the head section (of either embodiment) may be formed of a hardened resin shaped into the nut-like structure with either the single or double disk-like surface(s). It should be readily apparent that more durable screws may be used for installations where steel studs will need to be penetrated. In either embodiment, the metal screw Phillips head would present itself flush with the outer disk-like surface. In this manner, a user could utilize a standard Phillips head screwdriver to initially set the adjustment mechanisms at spaced intervals along the inner edge of the rough opening. While a manual screwdriver is possible, it should be understood that a motorized device may be used such as, but not limited to, air impact drivers or battery operated screwdrivers. Once the adjustment mechanisms were set firmly in place, the user would set in the jamb to generally rest upon each outer disk-like surface. Because the metal screw Phillips head would therefore no longer be accessible buy the user, a suitable wrench would then be used to fine tune the adjustment of each adjustment mechanism thereby shimming up the installed jamb within the rough opening until the jamb is squared up and firmly seated. The adjustment mechanisms would therefore remain permanently in place and the window framing completed.

As mentioned, in either embodiment the head section is formed integrally of a hardened resin material. High impact plastic may be a suitable material for this, though any moldable and suitably durable material may be used for the head section without straying from the intended scope of the present invention. Likewise, in either embodiment the threaded section is formed of a metal screw. The head of the screw should be held exposed but flush within the head section to enable a screwdriver access to initially embed the threads within the inner edge of the rough opening. It should be readily apparent that although a phillips head metal screw is shown and described, any particular screw head and related screwdriver may be utilized such as flat, star, hex, or any other configuration without straying from the intended scope of the present invention.

In manufacture of the present invention, the size of the disk-like surface(s) of either embodiment may be variable. For example, some implementations may involve use with windows that may be relatively large and/or weighty. In such instances, the disk-like surface(s) would be molded to be relatively larger in diameter so as to provide more surface area abutting, and thereby supporting, the window jamb. Likewise, smaller windows may require smaller disk-like surface(s). Still further, the threaded section may vary in size depending upon the given application. Yet still further, it should be readily apparent that when the embodiment as seen in FIG. 3 is provided having two disk-like surfaces each surface may vary in diameter relative to one another—i.e., the first disk-like surface abutting the jamb may be larger or smaller than second disk-like surface. Accordingly, changes in sizes should not vary the intended scope of the present invention.

It should also be apparent to those well versed in the materials art that the adjustment mechanism in accordance with the present invention should be manufactured in such a manner so as to avoid decoupling of the head section's material with the threaded section's material. A variety of methods may be useful in appropriately joining the head section with the threaded section. These methods may include providing the metal screw head with scoring or knurling prior to molding of the head section thereon. Likewise, the metal screw may be of non-standard type that is customized with protrusions which assist in anchoring the screw to the molded head section. It has also been found to be useful with regard to manufacture of the present invention to first heat treat the metal screw of the threaded section for embedding within the pre-molded head section. In this manner, the seating of the metal screw is markedly improved thus improving the integrity of the joint between differing materials.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An apparatus for installation of a construction component within a pre-framed rough opening comprising:
    a screw having a head, a tip, and a threaded section disposed between the head and the tip;
    a substantially rigid head section, having an upper portion and a lower portion, wherein the upper portion is a disk having a substantially flat upper surface and the lower portion is a nut; and
    wherein the head section is fixedly attached to the screw such that the lower portion of the head section is oriented toward the tip of the screw and the head of the screw is exposed through and substantially flush with the substantially flat upper surface of the upper portion of the head section.

2. The apparatus of claim 1 wherein the tip of the screw is a self-tapping tip.

3. The apparatus of claim 1 wherein the screw is a hex washer screw.

4. The apparatus of claim 1 wherein the nut is a hexagonal nut.

5. The apparatus of claim 1 wherein the head of the screw includes one or more protrusions to assist in anchoring the screw to the head section.

6. The apparatus of claim 1 wherein the screw is positioned within the head section such that the screw head is located in the center of the head section relative to the outer circumference of upper portion of the head section.

7. The apparatus of claim 1 wherein the head section is molded plastic.

* * * * *